United States Patent [19]

Niwa et al.

[11] Patent Number: 4,616,322

[45] Date of Patent: Oct. 7, 1986

[54] METHOD AND APPARATUS FOR PREPARING SPARE TOOLS FOR A MACHINE TOOL

[75] Inventors: Kuniyuki Niwa; Yoshiyuki Fujimura, both of Kariya, Japan

[73] Assignee: Toyoda Koki Kabushiki Kaisha, Kariya, Japan

[21] Appl. No.: 622,882

[22] Filed: Jun. 21, 1984

[30] Foreign Application Priority Data

Jun. 29, 1983 [JP] Japan ............................... 58-117696

[51] Int. Cl.⁴ ............................................. G06F 15/46
[52] U.S. Cl. ..................................... 364/474; 29/568; 364/184
[58] Field of Search ................. 364/474, 475, 167–171, 364/184; 318/567, 568, 569, 565, 561; 29/568

[56] References Cited

U.S. PATENT DOCUMENTS

| | | | |
|---|---|---|---|
| 4,404,506 | 9/1983 | Nishimura et al. | 318/561 |
| 4,430,717 | 2/1984 | Senda et al. | 364/474 |
| 4,442,494 | 4/1984 | Fromson et al. | 364/474 |
| 4,456,960 | 6/1984 | Wakai | 364/474 |
| 4,473,883 | 9/1984 | Yoshida et al. | 364/474 |
| 4,543,636 | 9/1985 | Noda et al. | 364/474 |
| 4,551,808 | 11/1985 | Smith et al. | 364/475 |

*Primary Examiner*—Joseph Ruggiero
*Attorney, Agent, or Firm*—Oblon, Fisher, Spivak, McClelland & Maier

[57] ABSTRACT

In a numerical control system, a plurality of machine tools are provided each having a tool spindle, a tool magazine for storing primary tools along with spare tools respectively associated with some of the primary tools, and a tool changer for changing tools between the tool spindle and the tool magazine. A system control host computer included in the system divides the operational period of each machine tool into a plurality of operational period sections and calculates prospective used times of primary tools which are programmed to be used on the tool spindle in accordance with at least one numerical control program within each of the operational period sections. The host computer then estimates primary tools whose lives will expire within each operational period section, based upon cumulative past used times, the prospective used times and life times of the primary tools and searches for tool number data of spare tools associated with the estimated primary tools. The tool number data of the spare tools are applied to a tool replacing controller which controls tool replacing robots and a tool transporter provided between a tool stocker and the tool magazine of each machine tool, so that the spare tools can be transferred from the tool stocker to the tool magazine of each machine tool.

11 Claims, 13 Drawing Figures

FIG. 3

| TOOL NO. | LIFE TIME | CUM. USED TIME | SPARE TOOL | LENGTH COMP. | LIFE ENDED | TIT |
|---|---|---|---|---|---|---|
| T 01 | L 01 | U 01 | T 21 | H 01 | x | |
| T 03 | L 03 | U 03 | T 23 | H 03 | | |
| T 05 | L 05 | U 05 | T 25 | H 05 | | |
| ⋮ | ⋮ | ⋮ | ⋮ | ⋮ | ⋮ | |
| T 21 | L 21 | U 21 | T 21 | H 21 | | |
| T 25 | L 25 | U 25 | T 25 | H 25 | | |
| ⋮ | ⋮ | ⋮ | ⋮ | ⋮ | ⋮ | |

FIG. 5(a)

| | | TMT |
|---|---|---|
| 0 1 | $ | |
| 0 2 | T 10 | |
| 0 3 | T 05 | |
| ⋮ | ⋮ | |
| 1 3 | T 01 | |
| 1 4 | T 25 | |

| | UTNA |
|---|---|
| T 21 | |

FIG. 5(b)

| | | TMT |
|---|---|---|
| 0 1 | $ | |
| 0 2 | T 10 | |
| 0 3 | T 05 | |
| ⋮ | ⋮ | |
| 1 3 | T 21 | |
| 1 4 | T 25 | |

| | UTNA |
|---|---|
| T 01 | |

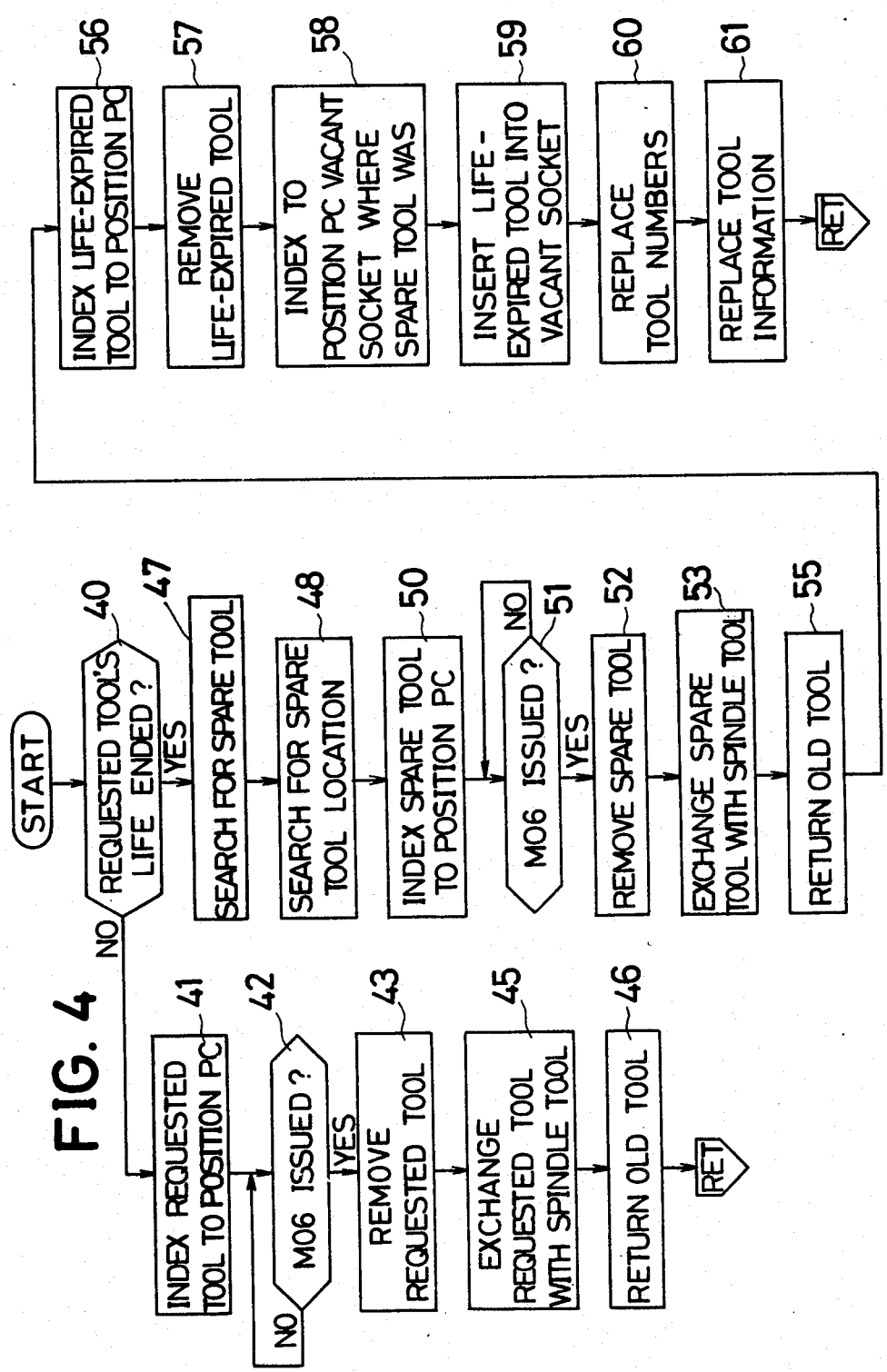

FIG. 7(a)

MTT

| TOOL CONTROL NO. | LIFE TIME | LENGTH COMP. |
|---|---|---|
| T0120 | $l_1$ | $h_1$ |
| T0355 | $l_2$ | $h_2$ |
| T0503 | $l_3$ | $h_3$ |
| ⋮ | ⋮ | ⋮ |
| T2110 | $l_{n-1}$ | $h_{n-1}$ |
| T2500 | $l_n$ | $h_n$ |
| ⋮ | ⋮ | ⋮ |

FIG. 7(b)

STT

| MT1 | | | |
|---|---|---|---|
| TOOL NO. | TOOL CONTROL NO. | LIFE TIME | SPARE TOOL CONTROL NO. |
| ⋮ | ⋮ | ⋮ | ⋮ |
| T21 | T1150 | $l_{21}$ | T2110 |
| T22 | T1230 | $l_{22}$ | T2500 |
| ⋮ | ⋮ | ⋮ | ⋮ |

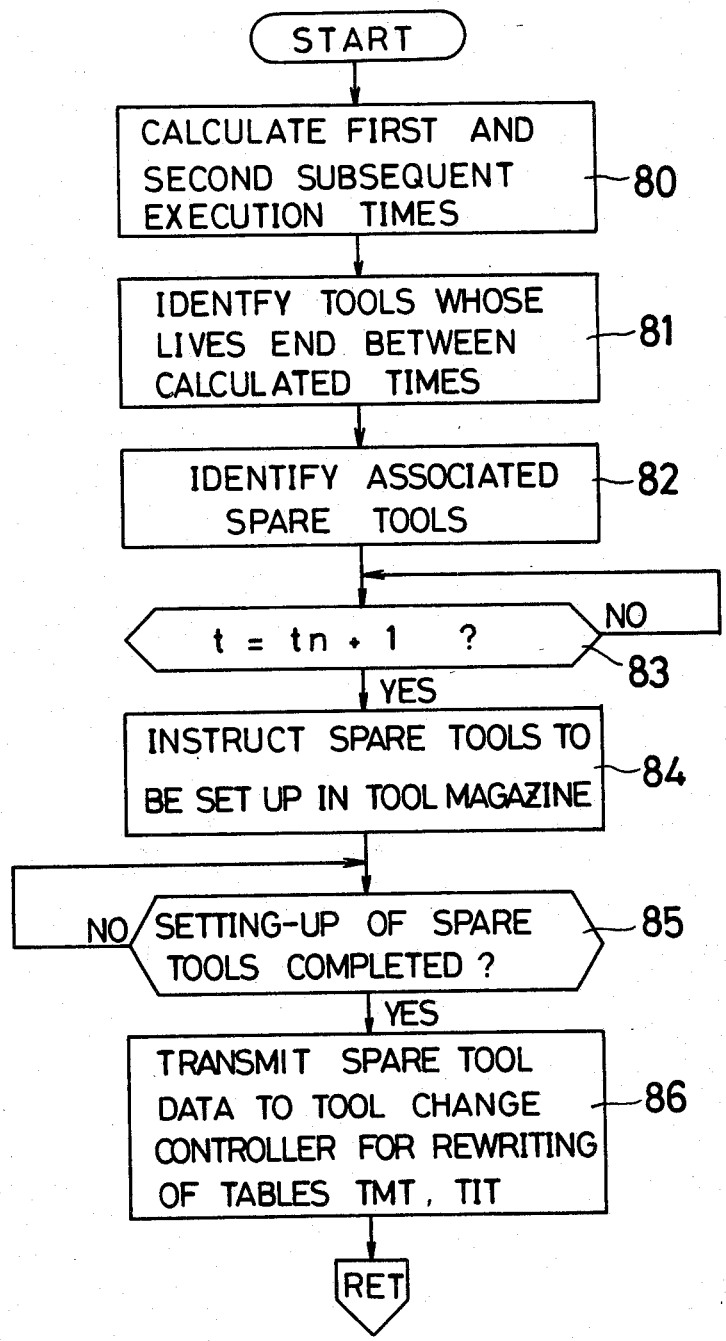

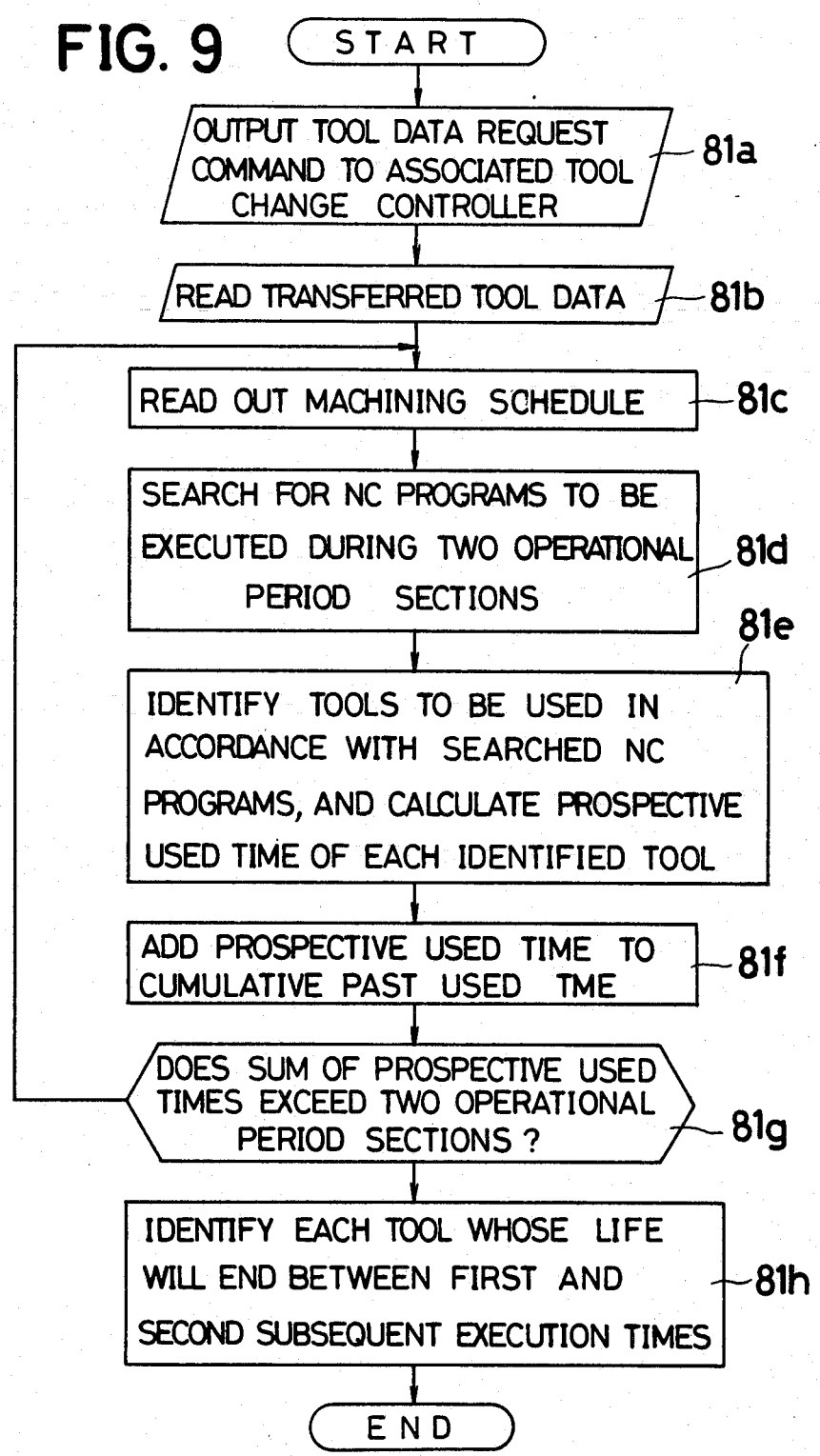

METHOD AND APPARATUS FOR PREPARING SPARE TOOLS FOR A MACHINE TOOL

BACKGROUND OF THE INVENTION

1. Field of the Invention

The present invention relates to a method and apparatus for preparing spare tools for a machine tool of the type wherein a number of spare tools associated with some of primary tools, along with the primary tools, are stored in a tool magazine each for use on a tool spindle of the machine tool in place of an associated one of the primary tools when the same reaches the end of its life.

2. Description of the Prior Art

In a known machine tool with a spare tool change function, a tool magazine stores a number of spare tools respectively associated with some of primary tools, in addition to the primary tools. When one of the primary tools reaches the end of its life, a tool exchanger attaches an associated one of the spare tools on a tool spindle, in place of the life-expired primary tool. It is therefore possible for the machine tool to automatically perform the change-over from a life-expired primary tool to an associated spare tool without discontinuing the automatic continuous operation of the machine tool.

The machine tool, however, requires that spare tools corresponding in number to all of primary tools which are liable to be subjected to wear or damage, be stored in the tool magazine at a time. This disadvantageously results in an increased capacity of the tool magazine for the spare tool change function. Particularly, this drawback is unavoidable in the case that a primary tool needs not only a first spare tool, but also a secondary spare tool.

SUMMARY OF THE INVENTION

Accordingly, it is a principal object of the present invention to provide a novel method in which a spare tool storage area of a tool magazine can be reduced without decreasing the number of spare tools each of which is to be used on a tool spindle of a machine tool in place of an associated one of primary tools being stored in the tool magazine, after the life of the associated primary tool expires.

Another object of the present invention is to provide a novel method of the character set forth above which is capable of preparing each of spare tools associated with primary tools before an associated primary tool reaches the end of its life.

A further object of the present invention is to provide a novel apparatus for performing the above-noted method in a numerical control machine tool with an automatic tool changer.

A still further object of the present invention is to provide an novel apparatus of the character set forth above which is particularly suitable for the application to a direct numerical control (DNC) system for a plurality of machine tools.

Briefly, according to the present invention there is provided a novel method of supplying a tool magazine of a machine tool with spare tools each of which is to be replaced with an associated one of primary tools being stored in the tool magazine when the associated primary tool reaches the end of its life. In the method, the operational period of the machine tool is divided into a plurality of operational period sections. At least one primary tool which is to be used within each of the operational period sections is identified, and a prospective used time within said each operational period section is calculated with the at least one primary tool. Whether or not the life of the at least one primary tool will expire within said each operational period section is ascertained based upon the prospective used time as well as a cumulative past used time and a life time which are registered in a tool data memory. When the life expiration of the at least one primary tool is ascertained, a spare tool associated therewith is identified to be set up in the tool magazine.

With the method according to the present invention, life expiration is estimated regarding each primary tool which is to be used within each of operational period sections. It is therefore possible to make the spare tool prepared in the tool magazine in the beginning of each operational period section within which the primary tool reaches the end of its life. This successfully avoids the concurrent storage of all the necessary spare tools in the tool magazine, whereby the capacity of the tool magazine can be diminished.

Preferably, the identification of each primary tool which is to be used within each of the operational period sections is effected by searching for at least one numerical control (hereafter referred to as "NC") program which is scheduled to be executed within the operational period section. The calculation of a prospective used time of each primary tool is effected by dividing feed amount data by feed rate data which are given in the searched NC program in relation to the identified primary tool. Further, the life expiration of the identified primary tool within the operational period section is ascertained by the comparison of the registered life time with the sum of the registered cumulative past used time and the calculated prospective used time.

In another aspect of the present invention, there is further provided an apparatus for carrying out the devised method in a machine tool with an automatic tool changer. In this apparatus, human intervention may be required for replacing a designated spare tool with a life-expired primary tool. However, the present invention in still another preferred form employs a tool replacing robot for effecting such tool replacement.

In a further aspect of the present invention, the ascertainment of whether or not the identified primary tool will reach the end of its life within one of the operational period sections is executed in the begining of a preceding operational period section, so that an associated spare tool therefor can be stored in the tool magazine in the begining of said one operational period section. This secures a sufficient time to transport the spare tool from a tool stocker located away from the machine tool site to the machine tool. Therefore, the present invention in this aspect is suitable for practice in a direct numerical control system constituted by a plurality of machine tools.

Herein, the term "primary tools" means those tools which are stored in a substantial part of the magazine tool storage area for transfer therefrom to a tool spindle and vice versa, whereas the term "spare tools" means those tools which are stored in a spare tool storage area occupying a part of the magazine tool storage area each for use on the tool spindle in place of an associated primary tool after the same reaches the end of life. Further, the term "secondary spare tools" means those tools each of which is used on the tool spindle in place of an associated spare tool after the same reaches the end of life. Accordingly, it can be realized that after the life expiration of each primary tool, the same becomes no longer a primary tool and the spare and secondary spare tools associated therewith respectively become a primary tool and a spare tool.

BRIEF DESCRIPTION OF THE ACCOMPANYING DRAWINGS

The foregoing and other objects, features and attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIG. 3 is an explanatory view illustrating the detail of a tool information table TIT shown in FIG. 2;

FIG. 4 is a flow chart of a tool change routine executed by a microprocessor unit 30 shown in FIG. 2;

Figure 1:
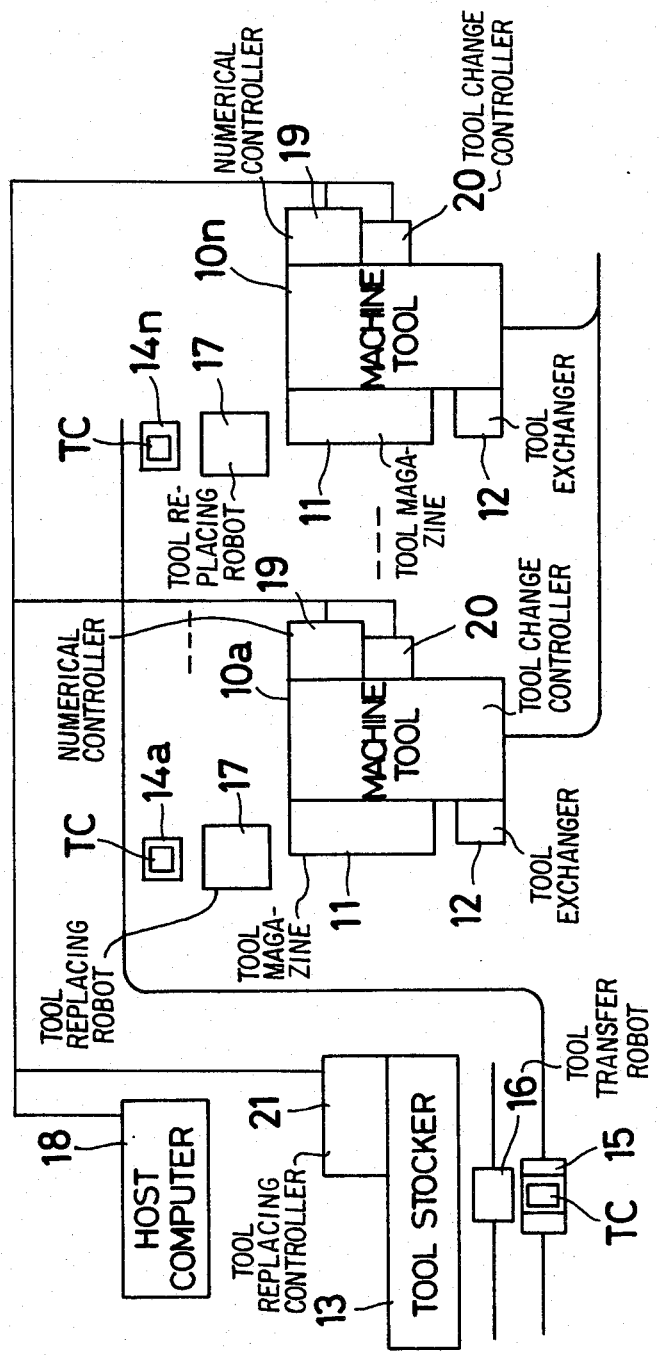
FIG. 1 is a schematic view showning the general configuration of a machine tool numerical control system to which the present invention is applied.
Figure 2:
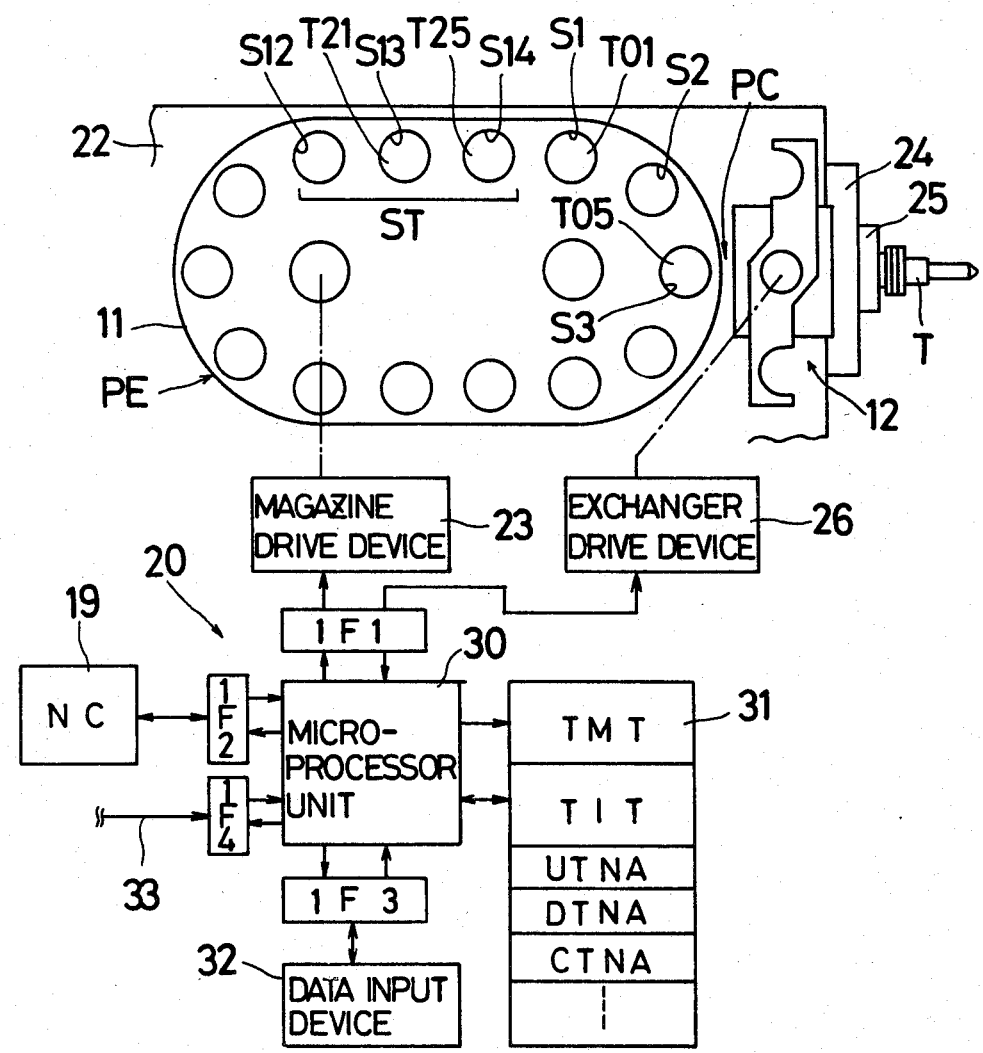
FIG. 2 is an elevational view of a tool magazine provided on each of the machine tools, also showing a block diagram of a tool change controller for each machine tool.
Figure 6:
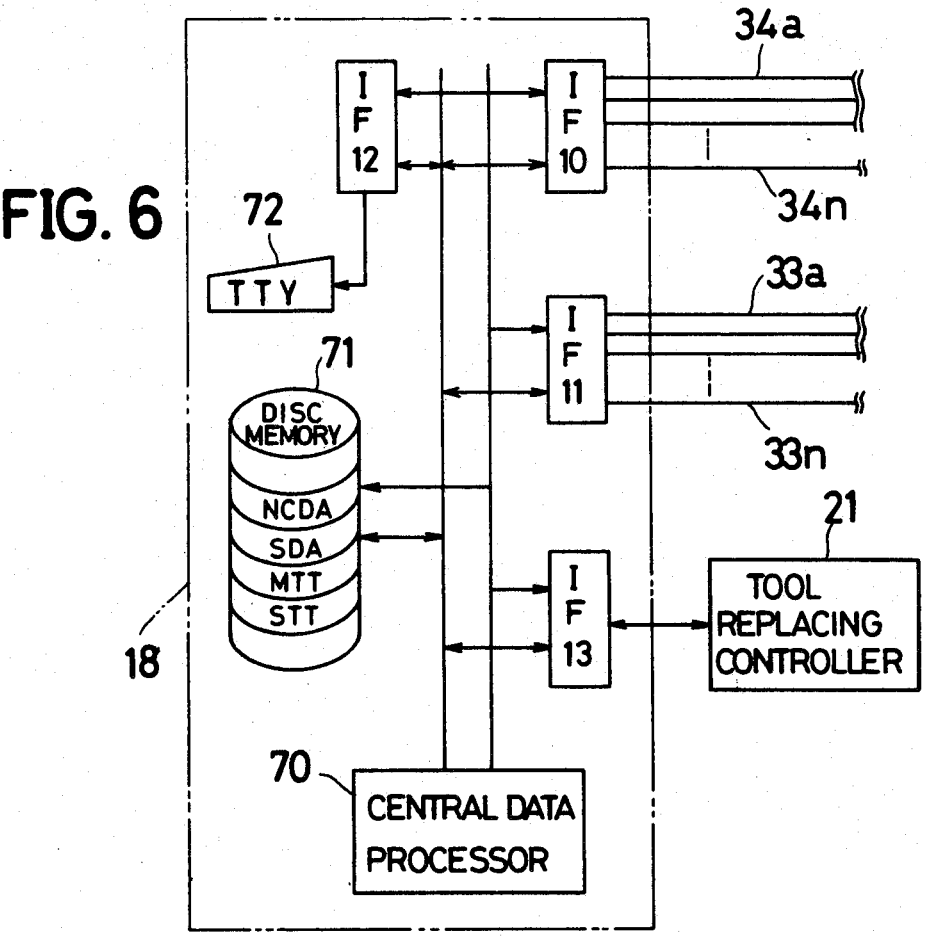
Figure 10:
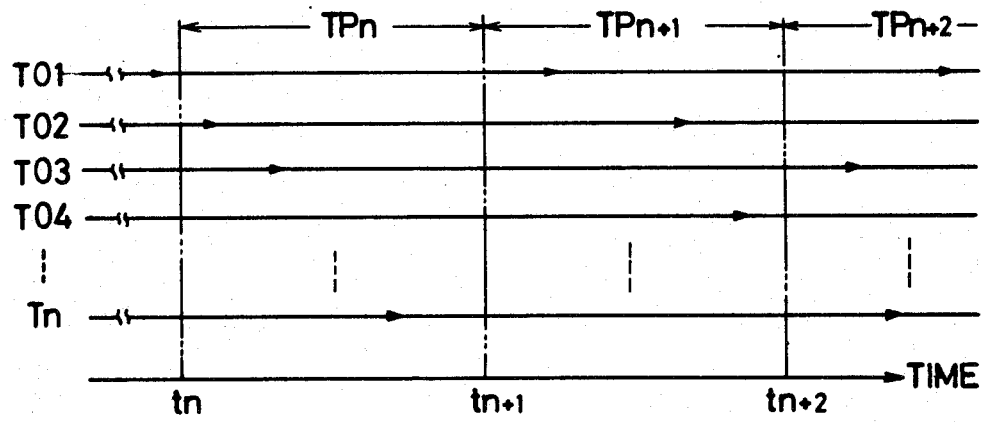
Figure 11:
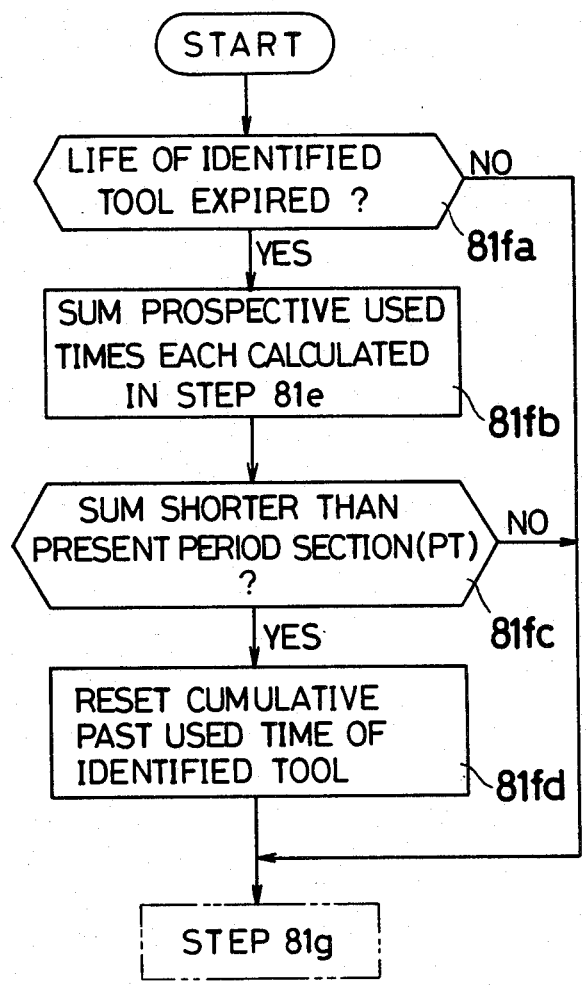

FIGS. 5(a) and 5(b) are explanatory views respectively illustrating the contents before and after the life expiration of a certain tool, of a tool magazine table TMT shown in FIG. 2;

FIG. 6 is a block diagram of a host computer shown in FIG. 1;

FIGS. 7(a) and 7(b) are explanatory views respectively illustrating the contents of a primary tool table MTT and a subordinate tool table STT formed in a disc memory shown in FIG. 6;

FIG. 8 is a flow chart of a spare tool preparation routine executed by a central data processor shown in FIG. 6;

FIG. 9 is a life-expired tool indentification routine executed by the central data processor in step 81 of FIG. 8;

FIG. 10 is a time chart indicating the lives of tools used in each machine tool; and FIG. 11 is a flow chart of a cumulative used time resetting routine which is incorporated into step 81f of FIG. 9 to be executed by the central data processor.

DETAILED DESCRIPTION OF A PREFERRED EMBODIMENT

Referring now to the drawings and particularly to FIG. 1 thereof, a machine tool numerical control system to which the present invention is applied is shown comprising a number of machine tools 10a-10n, each of which is provided with a tool magazine 11 and a tool exchanger 12. The system further comprises a tool stocker 13 for storing a plurality of spare tools. A self-propelled tool transporter 15 is movable between the machine tools 10a-10n and the tool stocker 13 for transferring tools therebetween.

A tool transfer robot 16 is disposed in the vicinity of the tool stocker 13 for transferring tools between the tool stocker 13 and a tool transfer pallet TC on the tool transporter 15 positioned at the site of the tool stocker 13, while tool replacing robots 17 are respectively disposed behind the tool magazines 11 of the machine tools 10a-10n for transferring tools between tool transfer pallets TC on pallet rests 14a-14n disposed behind the machine tools 10a-10n and the tool magazines 11.

A host computer 18 for system control is coupled to numerical controllers 19 and tool change controllers 20 which are respectively associated with the machine tools 10a-10n. The host computer 18 is also coupled to a tool replacing controller 21 for instructing the same to control the transfer of tools between the tool stocker 13 and the tool magazine 11.

As shown in FIG. 2, the tool magazine 11 of each machine tool, e.g., 10a is mounted on a lateral surface of a column 22 of the machine tool 10a and is rotationally indexable by a magazine drive device 23. The tool exchanger 12 exchanges a tool T indexed to a tool change position PC with a tool T received in a tool spindle 25 rotatably carried in a spindle head 24 of the machine tool 10a.

The tool change controller 20 is composed of a microprocessor unit 30, which is coupled through an interface IF1 to the magazine drive device 23 and an exchanger drive device 26 which operates the tool exchanger 12. The microprocessor unit 30 is also coupled to the numerical controller (NC) 19 through an interface IF2. A memory device 31 coupled to the microprocessor unit 30 is formed therein with a tool magazine table TMT, a tool information table TIT and so forth. The table TMT stores tool numbers of the tools T being stored in the tool magazine 11, as shown in FIG. 5(a). The table TIT stores a life time, a cumulative past used time and so forth with respect to each of the tools T being stored in the tool magazine 11, as shown in FIG. 3.

Also coupled to the microprocessor unit 30 through an interface IF3 is a data input device 32 for setting initial data in the tool magazine table TMT, the tool information table TIT and the like formed in the memory device 31. Data transmission lines 33 extending from the host computer 18 reach an interface IF4 copuled to the microprocessor unit 30.

TOOL EXCHANGE OPERATION

Assuming now that one of the numerical controllers 19 outputs T-code data to instruct the selection of a primary tool T, the microprocessor unit 30 identifies the T-code data by the execution of a main routine, not shown, whereupon it further executes a tool change routine shown in FIG. 4, as described hereafter in detail.

With the change routine being executed, whether the requested primary tool T has reached the end of its life or not is ascertained by reference to the tool information table TIT (step 40). Unless the end of life has been reached yet, processings of steps 41-46 are executed, whereby the requested primary tool T is indexed to the tool change position PC and upon issuance of a tool exchange M-code M06 from the numerical controller 19, is exchanged with another tool T being received in the tool spindle 25 of the associated machine tool 10a, for example. This series of the processings causes the tool T which was received in the tool spindle 25 by now, to be returned into a storage location or socket of the tool magazine 11 where it was.

If the designated tool T is ascertained to have reached the end of its life, on the other hand, reference is made to the tool information table TIT to search for a spare tool ST which is assigned to the life-expired tool T. (step 47) The tool magazine table TMT is then searched for a magazine tool socket S in which the searched spare tool ST is stored (step 48), whereupon the tool magazine 11 is indexed to position the magazine tool socket S to the tool change position PC. (step 50) As the tool exchange code M06 is given from the numerical controller 19 in step 51, the spare tool ST is removed (step 52) to be exchanged with the tool T being received in the tool spindle 25 (step 53), while the tool T removed from the tool spindle 25 is returned into a tool socket S where it was. (step 55)

Further, in the case that a tool exchange operation is performed regarding the spare tool ST, the above-described processings are then followed by other processings of steps 56–61 so as to transfer the life-expired tool T into the tool socket S where the spare tool ST now in use on the tool spindle 25 was stored.

Specifically, the tool socket S now storing the life-expired tool T is identified by reference to the tool magazine table TMT to be indexed to the tool change position PC, and the life-expired tool T is removed from the indexed tool socket S. (steps 56 and 57) Then, the tool socket S which is now vacant due to removal of the spare tool ST therefrom is indexed to the tool change position PC, and the life-expired tool T is inserted into the vacant tool socket S instead. (steps 58–59)

Consider now, for example, that since the expiration of life was ascertained of a primary tool T01 being stored in a N0-1 tool socket S1, a spare tool T21 for the primary tool T01 has been inserted instead into the tool spindle 25. In this case, after insertion of the spare tool T21 into the tool spindle 25, the foregoing processings in steps 56–59 cause the life-expired primary tool T01 being stored in the N0-1 tool socket S1, to be removed therefrom and then, to be inserted into a N0-13 tool socket S13 from which the spare tool T21 has been removed.

The microprocessor unit 30, in the course of the transfer processings for the life-expired tool T01, executes the rewriting of tool numbers in dependence upon such tool transfer. In the tool magazine table TMT before the tool number rewriting, as shown in FIG. 5(a), a tool vacant mark "$" indicating that no tool is stored is written in a memory location "01" corresponding to the N0-1 tool socket S1 where the life-expired tool T01 was, while the tool number of the life-expired tool T01 is written in another memory location "13" corresponding to the N0-13 tool socket S13 from which the spare tool T21 has been removed. The tool number of the spare tool T21 has been written in a spindle tool memory location UTNA which is provided for storing the tool number of a tool currently in use on the tool spindle 25.

In this situation, the microprocessor unit 30 executes step 60, wherein the tool number T01 being stored in the memory location "13" which corresponds to the N0-13 tool socket S13 is replaced with the tool number T21 being stored in the spindle tool memory location UTNA, as shown in FIG. 5(b). Step 61 is next executed, in which information on the life-expired tool T01 is replaced with information on the spare tool T21 within the tool information table TIT.

These processings enable the spare tool T21 to be treated as the tool T01 and because respective tool length compensation data therefor are replaced with each other, also enable appropriate tool length compensation data to be transmitted to the numerical controller 19 when requested. At the same time, the cumulative past used time of the tool T01 is initialized to indicate zero, whereby the information on the tool T01 is changed to indicate the information which is initially input for the spare tool T21.

In this manner, when a primary tool in the tool magazine 11 reaches the end of its life, the tool change controller 20 not only selects a spare tool associated with the life-expired tool and inserts it in the tool spindle 25, but also moves the life-expired primay tool into a tool socket where the spare tool was. Accordingly, where, for example, N0-12 through N0-14 tool sockets S12–S14 are assigned for storage of spare tools as is true in this particular embodiment, any life-expired primary tool T is necessarily returned into one of these tool sockets S12–S14. This makes the processings for removal of any life-expired primary tool easy to carry out, as will be referred to later.

It is to be noted herein that each time any tool is used on the tool spindle 25, the period of use thereon or the period of engagement with a workpiece is calculated to be added to the cumulative past used time of said each tool being stored in the tool information table TIT.

SPARE TOOL PREPARATION OPERATION

The host computer 18 executes an NC program distribution routine for distributing NC programs to the numerical controllers 19 and a spare tool preparation routine for controlling the tool replacing controller 21 so that at a predetermined time interval, unnecessary (time-expried) tools are removed from the tool magazine 11 of each of the machine tools 10a–10n so as to set up therein spare tools in place of the unnecessary tools. As shown in FIG. 6, the host computer 18 is composed of a central data processor 70, a disc memory 71, a data input/output device 72 such as a teletypewriter, and interfaces IF10–IF13. The inteface IF10 is coupled to the numerical controllers 19 of the machine tools 10a–10n via respective transmission lines 34a–34n, the interface IF11 is coupled to the tool change controllers 20 of the machine tools 10a–10n via respective transmission lines 33a–33n, and the interface IF13 is coupled to the tool replacement controller 21.

The disc memory 71 is formed with a schedule storage area SDA, a primary tool table MTT and subordinate tool tables STT in addition to an NC program area NCDA which stores a plurality of NC programs to be distributed to the numerical controllers 19 of the machine tools 10a–10n. The schedule storage area SDA stores respective machining schedules for the machine tools 10a–10n. As shown in FIG. 7(a), the primary tool table MTT stores data on the life time, tool length compensation amount and the like with respect to each of tools having been set up on the machine tools 10a–10n, each of tools being stored in the tool stocker 13 and each of other tools being used in the direct numerical control (DNC) system described herein. The subordinate tool tables STT are respectively associated with the machine tools 10a–10n, and FIG. 7(b) typically shows the subordinate tool table STT for the N0-1 machine tool 10a. Each of the subordinate tool tables STT stores tool numbers used on the tool magazine 11, tool control numbers and life times of the primary tools being stored in the tool magazine 11, in relation to tool control numbers of the spare tools which are usable respectively in place of the primary tools.

Necessary data are initially set by the data input/output device 72 in the data areas NCDA and SDA and the data tables MTT and STT in advance of the system operation, and the stored contents are thereafter changed or modified by the data input/output device 72 as need be.

The data processor 70 supplys the numerical controllers 19 with NC programs in accordance with the respective machining schedules being stored in the schedule storage area SDA. Further, the data processor 70 executes the spare tool preparation routine shown in FIG. 8 with respect to each of the machine tools 10a–10n at a predetermined time interval during which more than three life-expired tools, for example, do not remain simultaneously in each of the machine tools 10a–10n. The timings at which the spare tool preparation routine is executed respectively for the machine tools 10a–10n differ from one another lest a tool replacement operation for one of the machine tools 10a–10n should be carried out concurrently with a tool replacement operation for another. The time intervals at which the spare tool preparation routine is repeatedly executed depend upon the number of tool sockets S which are provided in the tool magazine 11 of each of the machine tools 10a–10n for storage of spare tools, as well as upon the contents of machining operations performed by each of the machine tools 10a–10n. That is, the time interval for each machine tool is set as long as possible so that more tools than tool sockets in each tool magazine 11 are available as spare tools, and so that the tools can be prevented from expiring their lives within the interval at which the spare tool preparation routine is executed for each of the machine tools 10a–10n and so that the number of tool replacements can be reduced.

When executing the spare tool preparation routine shown in FIG. 8 for one of the machine tools, e.g., 10a, the data processor 70 calculates the times at each of which the preparation routine is to be executed following the present execution thereof. That is, a time period which has expired after the starting of the initial system operation is checked for the present time (tn), to which a time period (TPn) is then added to calculate the first subsequent execution time (tn+1) at which the preparation routine is to be next executed. Further, a time period (TPn+1) is added to the first subsequent execution time (tn+1) so as to calculate the second subsequent execution time (tn+2). (step 80) Then, the reference to the subordinate tool table ST is made to estimate the tools T which reach the ends of their lives between the first and second subsequent execution times (tn+1) and (tn+2). (step 81)

FIG. 9 shows the detail of a life-expired tool identification routine that the data processor 70 executes in step 81 for each of the machine tools 10a–10n in the beginning of each of the time periods (or the operational period sections of each machine tool) TPn, TPn+1, TPn+2. Assuming now that the identification routine is executed for the machine tool 10a, first of all an instruction is given to the microprocessor unti 30 provided in the tool change controller 20 of the machine tool 10a, so that the tool data, i.e., the cumulative past used times and the life times of the tools being stored in the tool magazine 11 are read out from the memory device 31 and are transferred to the data processor 70. (step 81a) Upon completion of the reading-out of the tool data so transferred (step 81b), the data processor 70 reads out a machining schedule of the machine tool 10a (step 81c) and by reference to the machining schedule, searches the NC program area NCDA for one or more NC programs to be executed between the present and second subsequent execution times (tn) and (tn+2). (step 81d) Identifications are then made for the tools which are programmed to be used in accordance with tool exchange commands of the searched NC programs, and a prospective used time of each of the identified tools is calculated by dividing related feed amount data by related feed rate data which are given in the searched NC programs. (step 81e) The calculated prospective past used time of each tool is added to the cumulative used time data which has been transferred from the tool change controller 20 in connection with said each tool. (step 81f) These processings in steps 81c–81f are repeated until the sum of the prospective used times each of which is calculated in step 81e reaches the difference between the present and second subsequent execution times (tn) and (tn+2). (step 81g) Step 81h is then executed, wherein it is ascertained whether the cumulative used time for each tool to which the prospective used time therefor has been added in step 81f exceeds the life time being stored in the subordinate tool table STT for the same tool. When the cumulative used time exceeds the life time, then the tool is judged to reach the end of its life between the first and second execution times (tn+1) and (tn+2).

If the cumulative used time obtained in step 81f for a primary tool reaches the life time within the present execution time period TPn, an associated spare tool is used thereafter in place of the primary tool. In this case, therefore, the cumulative used time calculated in step 81f for the primary tool is reset to indicate zero, and the processings in steps 81c–81f are continued. This is accomplished by incorporating a cumulative used time resetting routine shown, for example, in FIG. 11 into step 81f.

When the tools are estimated which will become the ends of their lives within the period of the time (tn+1) through the time (tn+2), the data processor 70 identifies the tool numbers of spare tools respectively associated with the estimated tools, by reference to the transferred tool data which are registered in the subordinate tool table STT (step 82), and outputs these tool numbers to the tool replacing controller 21. (step 84)

The tool replacing controller 21, upon receipt of data representing the spare tool numbers, systematically controls the tool transporter 15, the tool transfer robot 16 and the tool replacing robot 17 to supply the tool magazine 11 of the machine tool 10a with the spare tools in the begining of the first subsequent execution time (tn+1). Consequently, the machine tool 10a is supplied with the spare tools to be replaced with the primary tools which are estimated to reach the ends of their lives between the first and second subsequent execution times (tn+1) and (tn+2).

More specifically, the tool replacing controller 21 operates the tool replacing robot 17 disposed by the machine tool 10a, on one hand, and gives a magazine index command to the tool change controller 20, on the other hand. Thus, the No-12 through No-14 tool sockets S12–S14 are indexed to a tool replacing position PE in turn so as to enable the life-expired primary tools to be successively unloaded from these tool sockets S12–S14 onto the tool transporter 15, and upon these unloading operations, the spare tools prepared on the tool transporter 15 are, in turn, inserted into the No-12 through No-14 tool sockets S12–S14.

Taking an example shown in FIG. 10, as primary tools T02, T03 and Tn reach the ends of their lives at respective times within the period TPn, the machine tool 10a after the respective times substitutes spare tools therefor which have already been set up in the tool magazine 11 since the time (tn). Thus, when the first subsequent execution time (tn+1) comes in step 83, the life-expired tools T02, T03 and Tn have been moved from the primary tool sockets to the spare tool sockets, i.e., the No-12 through No-14 tool sockets S12-S14. Because it was estimated at the time (tn) that the lives of the tools T01, T02 and T04 would expire between the first and second subsequent execution times (tn+1) and (tn+2), the above-described execution of step 84 by the data processor 70 causes the primary tools T02, T03 and Tn to be removed from the tool magazine 11 and instead, the spare tools associated with the primary tools T01, T02 and T04 to be set up in the tool magazine 11.

Upon completion of these spare tool preparation processings (step 85), the data processor 70 transmits tool numbers used on the tool magazine 11, of the spare tools which have already been set up in the tool mgazine 11, along with their storage location data, tool dimension compensation data and the like to the tool change controller 20 (step 86), whereby the spare tool preparation routine is thus completed.

The foregoing preparation routine is executed at a predetermined time interval, whereby spare tools for the primary tools whose lives expire during each of successive time periods each having a predetermined time length are prepared prior to the starting of said each time period and in the begining of said each time period, are replaced with unnecessary tools which reached the ends of their lives within a preceding time period. It is therefore possible to perform the supply of spare tools successively without discontinuing the operations of the machine tools 10a–10n and to reduce the storage area allocated in each tool magazine 11 for spare tools.

The above-described particular embodiment is directed to a system which automatically performs the supply of spare tools to the tool magazines 11 of the machine tools 10a–10n. However, the present invention is not limited to such a system and may be practiced otherwise than as described above. That is, the control numbers of spare tools which are to be set up in each of the machine tools 10a–10n and the numbers of tool sockets into which the spare tools are to be inserted respectively may be displayed by the data input/output device 72 coupled to the data processor 70, and in response to the displayed data, an operator may take out unnecessary tools from, and sets up the spare tools, into the tool magazine 11 of each of the machine tools 10a–10n.

The time interval at which the spare tool preparation routine is executed, need not be perdetermined and may be varied in such a way as to make the end of each time period TPn, TPn+1 or TPn+2 when all of the tools for which spare tools have been respectively stored in the tool magazine 11 reach the ends of their lives. In this case, it is possible to decrease the number of tool replacements.

Obviously, numerous variations and modifications are possible in light of the above teachings. It is therefor to be understood that within the scope of the appended claims, the present invention may be practiced otherwise than as specifically described herein.

What is claimed is:

1. A machine tool of the type wherein spare tools respectively associated with primary tools, along with said primary tools, are stored in a tool magazine each for use on a tool spindle of said machine tool in place of an associated one of said primary tools when the same reaches the end of its life, a method of preparing said spare tools for storage in said tool magazine comprising the steps of:

dividing the operational period of said machine tool into a plurality of operational period sections;

estimating when the life of at least one of said primary tools will expire within each of said operational period sections, based upon a cumulative past used time, a prospective used time and a life time of said at least one primary tool;

reading out from a data memory information on one of said spare tools associated with said at least one primary tool which is estimated to reach the end of its life within each of said operational period sections, so as to identify said one of said spare tools;

setting up in said tool magazine said identified spare tool to be used in place of said at least one primary tool, before said at least one primary tool reaches the end of its life; and attaching said identified spare tool to said tool spindle in place of said at least one primary tool when said at least one primary tool reaches the end of its life within each of said operational period sections.

2. A method as forth in cliam 1, wherein:

the step of setting up said identified spare tool in said tool magazine is performed in the beginning of one of said operational period sections within which said at least one primary tool reaches the end of its life.

3. A method as set forth in claim 2, wherein:

the step of estimating at least one of said primary tools is performed in the beginning of an operational period section preceding to said one of said operational period sections within which said at least one primary tool reaches the end of its life.

4. A method as set forth in claim 1, wherein the step of estimating at least one of said primary tools comprises the steps of:

searching for at least one NC program which is scheduled to be executed by said machine tool within each of said operational period sections;

searching for at least one of said primary tools which is programmed to be used on said tool spindle in accordance with said searched at least one NC program;

calculating said prospective used time of said searched at least one primary tool reached at the end of said each of said operational period sections;

estimating a prospective total used time of said at least one primary tool reached at the end of said each of said operational period sections, based upon said calculated prospective used time and said cumulative past used time;

comparing said prospective total used time of said at least one primary tool with said life time registered therefor so as to ascertain whether the life of said at least one primary tool will expire within said each of said operational period sections.

5. A method as set forth in claim 4, wherein the step of calculating said prospective used time includes the step of:

dividing feed amount data by feed rate data which are given in said searched at least one NC program.

6. In a numerical control system having a machine tool rotatably carrying a tool spindle, a tool magazine for storing primary tools along with spare tools respectively associated therewith, and a tool changer for changing tools between said tool spindle and said tool magazine, an apparatus for preparing spare tools for storage in said tool magazine comprising:

- machining program storage means for storing a plurality of NC programs and a machining schedule defining the order of said NC programs in which said machine tool is to be operated;
- tool data storage means for storing a cumulative past used time and a life time with respect to each of said primary tools;
- first calculation means for dividing the operational period of said machine tool into a plurality of operational period sections;
- search means for searching said machining program storage means for at least one of said NC programs which is to be executed within each of said operational period sections calculated by said first calculation means;
- second calculation means responsive to said search means for calculating a prospective used time of at least one of said primary tools which is to be used in accordance with said at least one NC program searched by said search means;
- third calculation means for identifying at least one of said primary tools which is estimated to reach the end of its life within each of said operational period sections, based upon said cumulative past used time, said life time and said prospective used time;
- tool changer control means coupled to said tool changer for controlling said tool changer to change said identified at least one primary tool with an associated one of said spare tools being stored in said tool magazine, when said identified at least one primary tool reaches the end of its life; and
- preparation means responsive to said third calculation means for enabling one of said spare tools associated with said identified at least one primary tool, to be prepared for storage in said tool magazine in place of said identified at least one primary tool.

7. An apparatus as set forth in claim 6, wherein said preparation means includes:

- a tool replacing robot for replacing said at least one primary tool being stored in said tool magazine, with said one spare tool prepared by said tool magazine.

8. An apparatus as set forth in claim 7, wherein:

said tool replacing robot is operated in the beginning of one of said operational period section within which said at least one primary tool reaches the end of its life.

9. An apparatus as set forth in claim 8, wherein:

said search means, said second calculation means and said third calculation means are successively operated in the begining of an operatinal period section preceding to said one of said operational period sections within which said at least one primary tool reaches the end of its life.

10. An apparatus as set forth in claim 9, wherein said preparation means further includes:

- a tool stocker located away from said machine tool, for storing said spare tools; and
- tool transport means movable between said tool stocker and said machine tool for transporting at least said spare tools from said tool stocker to the site of said machine tool so as to prepare said spare tools by said machine tool so that said tool replacing robot is able to set up any of said spare tools in said tool magazine.

11. An apparatus as set forth in claim 10, wherein said tool replacing robot is located by said tool magazine, and wherein said preparation means further includes:

- a tool transfer robot located by said tool stocker for transferring said spare tools between said tool stocker and said tool transport means positioned by said tool stocker.

* * * * *